United States Patent [19]

Hegde et al.

[11] 4,430,226

[45] Feb. 7, 1984

[54] METHOD AND APPARATUS FOR PRODUCING ULTRAPURE WATER

[75] Inventors: Ramesh S. Hegde, Chelmsford; Gary C. Ganzi, Lexington, both of Mass.

[73] Assignee: Millipore Corporation, Bedford, Mass.

[21] Appl. No.: 241,792

[22] Filed: Mar. 9, 1981

[51] Int. Cl.³ .......................... C02F 1/42; C02F 1/04; C02F 1/44

[52] U.S. Cl. ..................... 210/638; 210/650; 210/652; 210/669; 210/673; 210/686; 210/694; 210/259; 210/282; 210/287; 210/295; 210/433.2; 203/10; 203/39; 203/41; 159/DIG. 23; 202/176; 202/182

[58] Field of Search ............... 210/669, 673, 686, 687, 210/694, 650, 651, 652, 653, 654, 655, 638, 259, 263, 282, 287, 288, 295, 335, 433.2, 257.2; 203/10, 39, 41; 202/176, 182; 159/DIG. 23

[56] References Cited

U.S. PATENT DOCUMENTS

| | | | |
|---|---|---|---|
| 2,744,840 | 5/1956 | Daniels | 210/686 |
| 2,758,968 | 8/1956 | Williams | 210/694 |
| 3,194,683 | 7/1965 | Grosvenor | 210/673 |
| 3,444,079 | 5/1969 | Bowers | 210/694 |
| 3,639,231 | 2/1972 | Bresla | 210/673 |
| 3,985,648 | 10/1976 | Casolo | 210/694 |
| 4,118,317 | 10/1978 | Neeb | 210/686 |
| 4,154,704 | 5/1979 | Vinton | 210/694 |
| 4,161,445 | 7/1979 | Coillet | 210/673 |
| 4,184,893 | 1/1980 | Halvorson | 210/673 |
| 4,187,120 | 2/1980 | Kunin et al. | 210/686 |

FOREIGN PATENT DOCUMENTS 484310  1/1967  Japan ................... 210/686

OTHER PUBLICATIONS

Hackh's Chemical Dictionary, McGraw-Hill, New York 1969, p. 15.

*Primary Examiner*—Ernest G. Therkorn
*Attorney, Agent, or Firm*—Paul J. Cook; Andrew T. Karnakis

[57] ABSTRACT

A water treatment cartridge and method for producing ultrapure water is described. The cartridge comprises a container having therein a particulate admixture of activated carbon and mixed bed ion exchange resins. A source of water, preferably pretreated, is passed through the container, preferably following treatment by one or more cartridges containing mixed bed ion exchange resins. The carbon in the admixed cartridge removes residual organic contamination from the water and the resins remove ionic contamination from the carbon, without re-introducing organic material to the water.

12 Claims, No Drawings

METHOD AND APPARATUS FOR PRODUCING ULTRAPURE WATER

BACKGROUND OF THE INVENTION

This invention relates to water purification and more particularily to the provision of ultrapure water substantially free of both organic and ionic contaminants.

High purity water is required for many purposes, including use in analysis, medicine and biology. Standards for water purity for various uses have been established by a number of professional organizations. The American Society for Testing and Materials (ASTM), for example, classifies purified water into Types I, II, III, and IV, based upon maximum allowable impurities. One measurement commonly employed is specific resistivity of the water in megohm/cm. at 25° C., a measure of ionic contamination. Pure water has a theoretical resistivity of 18.2 and water can be provided approaching this value. Non-ionic contaminants such as organic materials and particulates are monitored by other analytical techniques and maximum values are sometimes specified.

Water is purified by a number of techniques, often used in combinations for the highest purity. These techniques include filtration, single or multiple distillation, sorption and ion exchange. Water initially treated by distillation or reverse-osmosis filtration is often "polished" or further purified by passage through activated carbon beds to sorb residual materials, principally organics, mixed beds of anion and cation exchange resins to remove residual ions, and then finally filtered through a microporous filter to remove residual particulates. Water of 18 megohm/cm. resistivity and low organic content can be thus provided.

Activated carbons contain ionic impurities, and occasionally collect microorganisms, which are released into the water. They are therefore normally used prior to treatment of the water with mixed ion exchange resins which remove the ions released. These resins, however, are organic and release trace quantities of organic contamination into the water. Such contamination is usually small, measured in the parts per billion range, and presents no undue problems for many uses. However, for some applications, for example trace organic analysis by high performance liquid chromatography (HPLC), such contamination can produce significant interference.

The need for improved techniques to reduce organic contaminants for critical applications is described in an article by Poirer and Sienkilwicz, entitled "Organic-free Water", American Laboratory, December 1980, pages 69–75. This article describes a device utilizing oxidation by ultraviolet light to reduce organics. While apparently effective, this treatment is relatively expensive and restricts output.

SUMMARY OF THE INVENTION

The principal object of the present invention is to provide simplified and economical devices and procedures for producing ultrapure water of high resistivity, preferably 16 to 18 megohm/cm., and with reduced organic impurities. Further objects include provision of purification devices and procedures which are easy to make and use and which provide results substantially equivalent to oxidation with ultraviolet light at greatly reduced cost.

The present invention is based on the surprising discovery that water passed through an admixture of particles of mixed ion exchange resins and activated carbon, low in ash content and preferably low in fines, after an initial rising period, is substantially free of both ionic and organic contamination, that is, has a resistivity of 16–18 megohm/cm. and is substantially free of organic contamination as measured by HPLC. Apparently, in admixture, the carbon removes organics released by the resins and the resins remove ions released by the carbon, and the contamination heretofore released by the later of the two sequential treatments is avoided or minimized. Moreover, it is believed that the ion exchange resins retard growth of microorganisms on the carbon. Ultrapure water, at good flow rates, is thus obtained readily and at low cost.

Simple admixture by any convenient technique is suitable. For example, admixture of the particles by rolling in a drum for about one hour is usually sufficient. Preferably the particles of resin and carbon are of similar size and are used in approximately equal weight amounts (dry basis), the carbon preferably comprising 30 to 70% of the admixture, and most preferably about 50%. Particle sizes commonly used for ion-exchange resins, for example about 0.2 to 2 mm. and more preferably 0.3 to 0.8 mm. are suitable.

The activated carbons employed should be sorptive to a wide variety of organic materials and should have a low ash (inorganic residue) content, preferably as low as feasible and not substantially in excess of one percent by weight. Carbons made by pyrolysing resins or high molecular weight petroleum distillate residues, inherently low in ash content, are preferred to washed carbons made from coal or vegetable materials, the latter typically having 5 to 20% ash prior to washing. Carbons from the preferred sources generally have good sorptive properties, are more uniform in size, and are generally more spherical in shape. Relatively uniform spherical particles are preferred for ease and stability in packing and to minimize production of fines by fracture in handling, storage and use. Minimum fines are preferred to minimize leaching and channeling although they may to some extent be controlled in use by recycling and by final filtration. Preferred carbons are illustrated in the Examples given below.

Admixtures according to the invention are free-flowing powders, even though the resins retain moisture (typically 30%) after air drying, and are readily packed into containers to form treatment cartridges. Since the carbons admixed make regeneration of the ion-exchange resins difficult, it is anticipated that the admixtures will be discarded when exhausted. For economy and to extend their useful life, the present admixtures are preferably used downstream of conventional, regenerable ion-exchange cartridges, and the water is preferably pretreated by distillation, ultrafiltration or reverse osmosis.

A preferred arrangement for treating water according to the present invention, feeds pretreated water to one or more ion-exchange cartridges, and then to one or more admixture cartridges. The admixture cartridges may include a final microporous filter if desired and the conduit discharging water from the final cartridge is fitted with a resistivity or other meter to monitor the quality of the effluent water. The conduit, downstream of the meter, is provided with a valve or other means for recycling the water through the ion-exchange and admixture cartridges until the desired water quality is obtained.

Admixtures prepared as herein described require an initial rinse cycle in relatively pure water to produce 16–18 megohm/cm. effluent. This may be accomplished by recycling as described above but may require an extended period of time. This time can be substantially reduced by soaking the admixture in deionized water, e.g. for one hour. Preferably the admixtures are first briefly rinsed, e.g. for 5–10 minutes, in flowing deionized water, then left in non-flowing deionized water to soak for one or more hours, and the flow resumed until the desired quality is attained. The admixtures may also be pre-soaked, prior to installation in the flowing system, if desired.

DESCRIPTION OF PREFERRED EMBODIMENTS

In each of the following Examples, water pre-treated by reverse osmosis and having a conductivity of about 5 micromhocm$^{-1}$ was pumped at 1.5 liters per minute in series through three identical containers, Millipore Corporation 12 inch×2 inch cyclindrical cartridges CDMB01204. The first two containers were filled with mixed bed anion and cation exchange resins, AMBERLITE grade IRN-150 of Rohm and Haas Company having an effective particle size between 0.38 and 0.60 mm. (16×50 U.S. Sieve Series). The third container was filled with an admixture of 300 grams of the activated carbon specified and 390 grams (30% water) of AMBERLITE IRN-150. The outlet of the third container was fitted with a resistivity meter and thereafter with a valved y-connection for selectively dispensing or recycling the output water through the three cartridges. Example 1 is most preferred.

EXAMPLE 1

The carbon employed was BAC, sold by the Linde Division of Union Carbide Corporation, having generally spherical particles between 0.59 and 0.84 mm. in size with a mean size of 0.7 mm., a bulk density of 0.58 to 0.61 g./cc., a surface area of 800–1200 m.$^2$/g., and an ash content of 0.5%. It is believed to comprise the pyrolysed residue of dried spheres of petroleum distillate residue.

Equal weights of BAC carbon and resin (dry basis) were added to a drum, sealed, and placed on a roller mixer and rolled for one hour. A uniform, free flowing admixture was obtained. About 690 grams thereof were added to the third container described above and connected for flow of water therethrough. A space of about 0.7 to 1.0 inches was left in the top of the container to allow for expansion when wet.

In a first series of tests, water was recycled through the three containers for 2 hours during which the resistivity rose from less than 1 to 13 megohm/cm. The pump was then turned off and the contents allowed to soak in non-flowing water for three hours. Upon reactivation of the pump, the resistivity was below 2 but rose to 16 within 25 minutes and remained at or about 16. HPLC tests at both 254 and 210 mm. showed substantially no organic contamination after passage of only a few liters of water.

In a second series of tests, with a fresh sample of the admixture, water was flowed through the containers for seven minutes and the pump turned off for 60 minutes. When the pump was turned back on, resistivity rose from less than 2 to 16 in five minutes and thereafter rose to 18 in about one hour. Thereafter when restarted after being inactive, the water returned to 18 within a few minutes.

In another series of tests, the water was discharged, rather than recycled, and the pump run continuously. Resistivity reached 16–18 within a few hours.

EXAMPLE 2

In this Example, WITCARB 950 of the Witco Chemical Company was substituted for the BAC carbon of Example 1. It had a mesh size (U.S. Sieve Series) between 8 and 40, corresponding to particle sizes between 0.4 and 2.4 mm., and is also produced from petroleum residue.

When mixed, assembled, and tested as in Example 1, water was flowed through the admixture of the third container for 60 minutes, the pump turned off for 1000 minutes, and thereafter produced 16 megohm/cm. water in four minutes after restarting the pump. Within about six additional minutes resistivity rose to 18 where it remained. HPLC tests confirmed the absence of detectible organic contamination almost immediately after start-up, i.e. within a few liters and minutes.

EXAMPLE 3

An experimental AMBERSORB XE 348 carbon of Rohm and Haas Co., having a density of 0.6 g/cm$^3$, surface area of 500 m$^2$/gm, particle size of 20–50, U.S. Sieve Series, corresponding to openings of 0.833 to 0.295 mm., and an ash content less than 1.5%, understood to comprise pyrolysed beads of ion exchange resin, was substituted for the BAC carbon of Example 1 with similar results for both ionic and organic contamination.

EXAMPLE 4

NUCHAR WV-G, a conventional activated carbon of Westvaco, Carbon Department, having a higher ash and fines content, a surface area of 1100 m$^2$/g, particle size (U.S. Sieve Series) of 8×40 corresponding to opening sizes of 2.36×0.417 mm., and a mean diameter of 0.9 to 1.2 mm. was substituted for the BAC carbon of Example 1. After extensive rinsing and soaking (rinsing for 15 minutes, soaking for 180 minutes, rinsing for 15 minutes, resoaking for 22 hours, and rerinsing for 90 minutes), resistivity due to ash and fines was only about 11 megohm/cm. Testing by HPLC showed partial but incomplete organic removal. This inexpensive carbon is therefore not preferred but can be used in applications where complete removal of ionic and organic materials, below the parts per million range, is not required.

Fines as used herein refers to undersize particles in or from the carbon, either initially present or generated by attrition and dusting in handling and use, some of which are very small. A minimum of fines, preferably less than 1% by weight, is preferred to avoid release into the water and plugging of columns and filters. Relatively strong particles providing a minimum of attrition are also preferred to minimize generation of fines and release of entrapped ash.

Admixtures according to this invention are believed to have a useful life at least equal to corresponding quantities of ion-exchange resin when used in the configuration described, e.g. at least 600 liters for 690 grams of admixture. The water is substantially free of organics after purging the system. Resistivity rises more slowly, but only on initial start-up, and is capable of reaching 16–18 megohm/cm. to meet all known specifications and requirements. In is preferred to use a carbon of wide organic sorption and low ash and fines as described in Examples 1-3, which will produce substantially pure water for all laboratory and process requirements.

It should be understood that the foregoing description is for the purpose of illustration and that the invention includes all modifications and equivalents within the scope of the appended claims.

What is claimed is:

1. The method for providing substantially de-ionized water with reduced organic contamination which comprises passing water through a cartridge containing a particulate admixture of activated carbon and mixed ion exchange resins.

2. The method according to claim 1 wherein said carbon has an ash content not substantially greater than one percent by weight.

3. The method according to claim 2 wherein said particles of carbon and resin are between about 0.2 and 2 mm. in size and the admixture comprises from about 30 to 70% carbon on a dry weight basis.

4. The method according to claim 2 wherein said carbon particles comprise the pyrolyzed residue of resins or higher molecular weight petroleum compounds.

5. The method according to any one of claims 1-4 wherein said water is pretreated by distillation, ion-exchange, ultrafiltration, reverse osmosis, or a combination thereof.

6. The method according to any one of claims 1-4 wherein the treated water has a resistivity of at least 10 megohm/cm. and is substantially free of detectable organic contamination when tested by HPLC at 254 and 210 nm.

7. The method according to any one of claims 1-4 wherein said water is pretreated first by reverse osmosis and thereafter by mixed bed regenerable ion exchange, prior to passage through said admixture, said water after said passage being substantially free of organic contamination and having a resistivity greater than 16 megohm/cm.

8. The method according to any one of claims 1-4 wherein, at start-up, said admixture is soaked in deionized water, followed by a rinsing period in flowing deionized water to attain the desired resistivity in reduced time.

9. A water treatment cartridge for obtaining ultrapure water with high resistivity and reduced organic contamination which comprises a container having an inlet and outlet for water and containing in the flow path between said inlet and outlet an effective admixture of mixed ion exchange resins and activated carbon.

10. A cartridge according to claim 8 wherein said particles are between about 0.2 and 2 mm. in size said admixture comprises between about 30 and 70% by weight on a dry basis, and said carbon has an ash content not substantially in excess of 1% by weight.

11. A water treatment system for producing high purity water which comprises at least one mixed bed ion-exchange cartridge, and downstream thereof at least one cartridge according to claims 9 or 10.

12. A water treatment system for producing high purity water which comprises a source of water treated by reverse osmosis or ultrafiltration, at least one cartridge of mixed bed ion exchange resins, and downstream thereof, at least one cartridge according to claims 9 or 10.

* * * * *